United States Patent [19]

Boucle et al.

[11] Patent Number: 4,748,648

[45] Date of Patent: May 31, 1988

[54] METHOD FOR AUTOMATIC DETERMINATION OF EXPOSURE OF A RADIOGRAPHIC FILM AND AN AUTOMATIC FILM-EXPOSING DEVICE FOR A DIAGNOSTIC RADIOLOGY INSTALLATION IN WHICH SAID METHOD IS EMPLOYED

[75] Inventors: Jean Boucle, Meudon; Jacques Delair, Bois D'Arcy, both of France

[73] Assignee: Thomson-CGR, Paris, France

[21] Appl. No.: 880,741

[22] Filed: Jul. 1, 1986

[30] Foreign Application Priority Data

Jul. 1, 1985 [FR] France .................................. 85 10201

[51] Int. Cl.⁴ .............................................. H05G 1/42
[52] U.S. Cl. ........................................ 378/97; 378/96; 378/108
[58] Field of Search ................... 378/96, 97, 108, 185; 250/482.1

[56] References Cited

U.S. PATENT DOCUMENTS

| | | |
|---|---|---|
| 2,193,021 | 3/1940 | Dietz ................................... 378/185 |
| 4,035,645 | 7/1977 | Meyer ................................... 378/97 |
| 4,061,920 | 12/1977 | Müllendorf et al. .................. 378/97 |
| 4,131,797 | 12/1978 | Franke ................................... 378/97 |
| 4,143,968 | 3/1979 | Sader et al. . |
| 4,260,894 | 4/1981 | Neumann ............................. 378/108 |
| 4,329,030 | 6/1982 | Aihara et al. . |
| 4,566,115 | 1/1986 | Brünn et al. .......................... 378/97 |

FOREIGN PATENT DOCUMENTS 2135205  2/1973  Fed. Rep. of Germany ...... 378/108

Primary Examiner—Craig E. Church
Assistant Examiner—John C. Freeman
Attorney, Agent, or Firm—Oblon, Fisher, Spivak, McClelland & Maier

[57] ABSTRACT

The exposure of a radiographic film to x-radiation transmitted through an intensifying screen during a period of exposure T is determined automatically in accordance with a method which achieves compensation for the effect of deviation from the reciprocity law by comparing a value representing the exposure attained by the screen-film pair with a reference value which is variable as a function of time in accordance with a predetermined law.

16 Claims, 3 Drawing Sheets

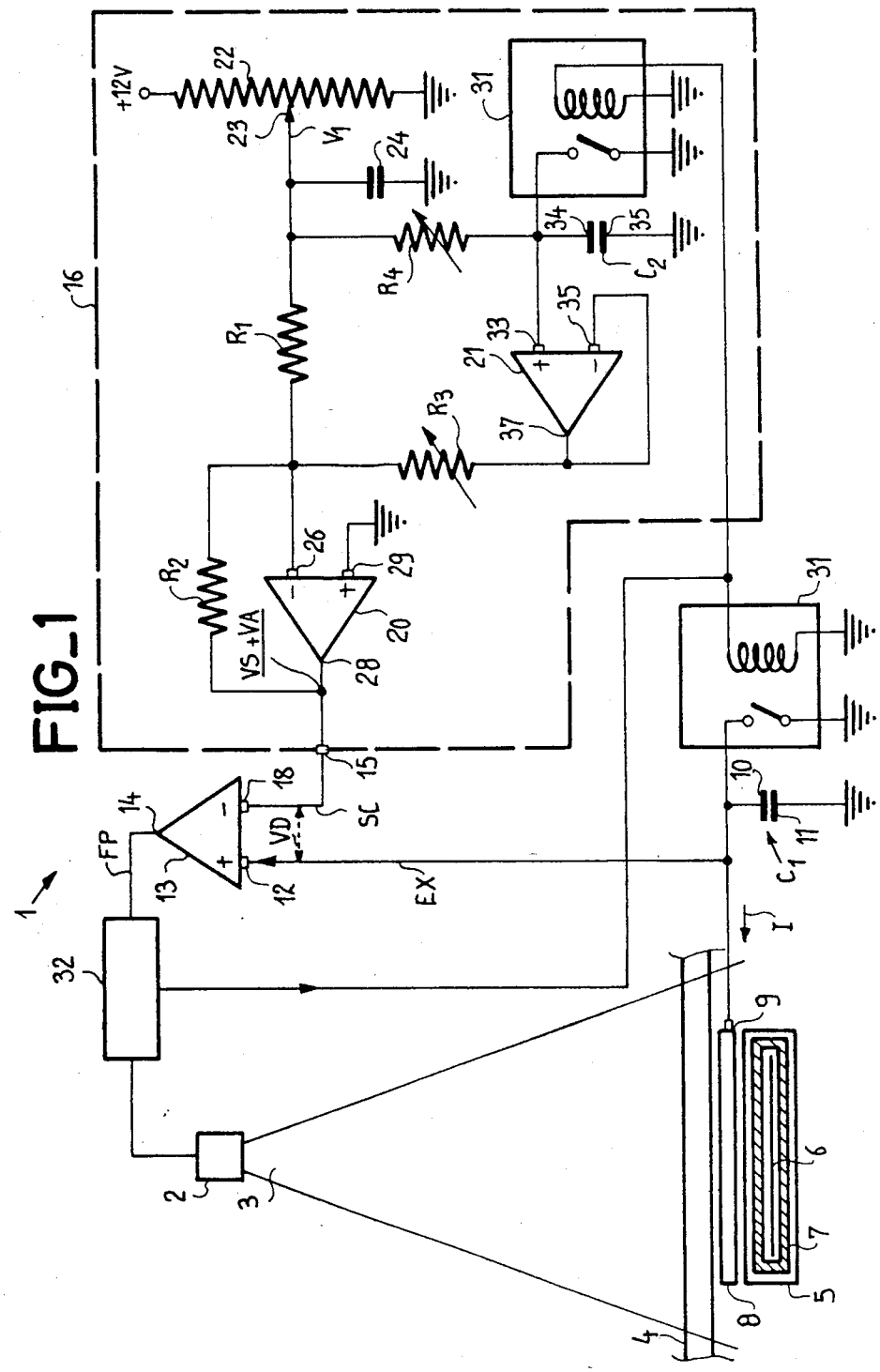
FIG_1

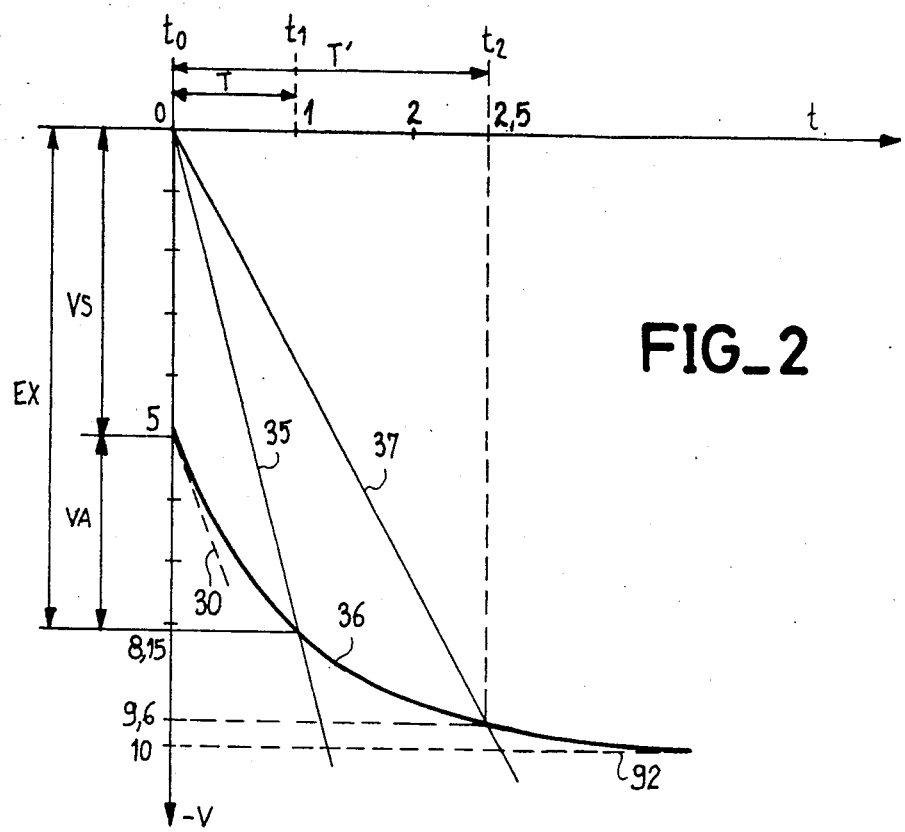
FIG_2
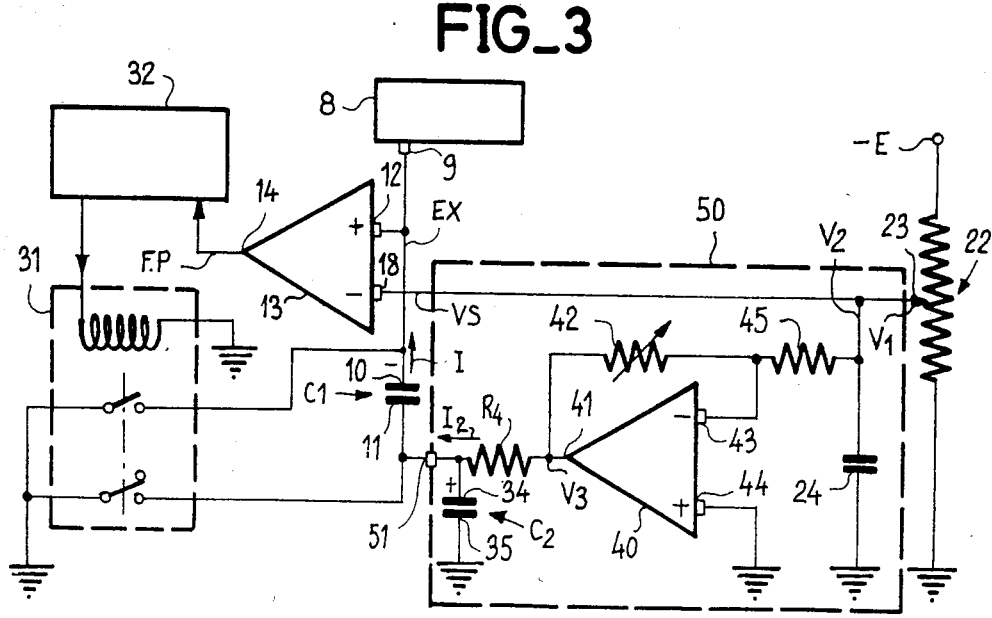
FIG_3

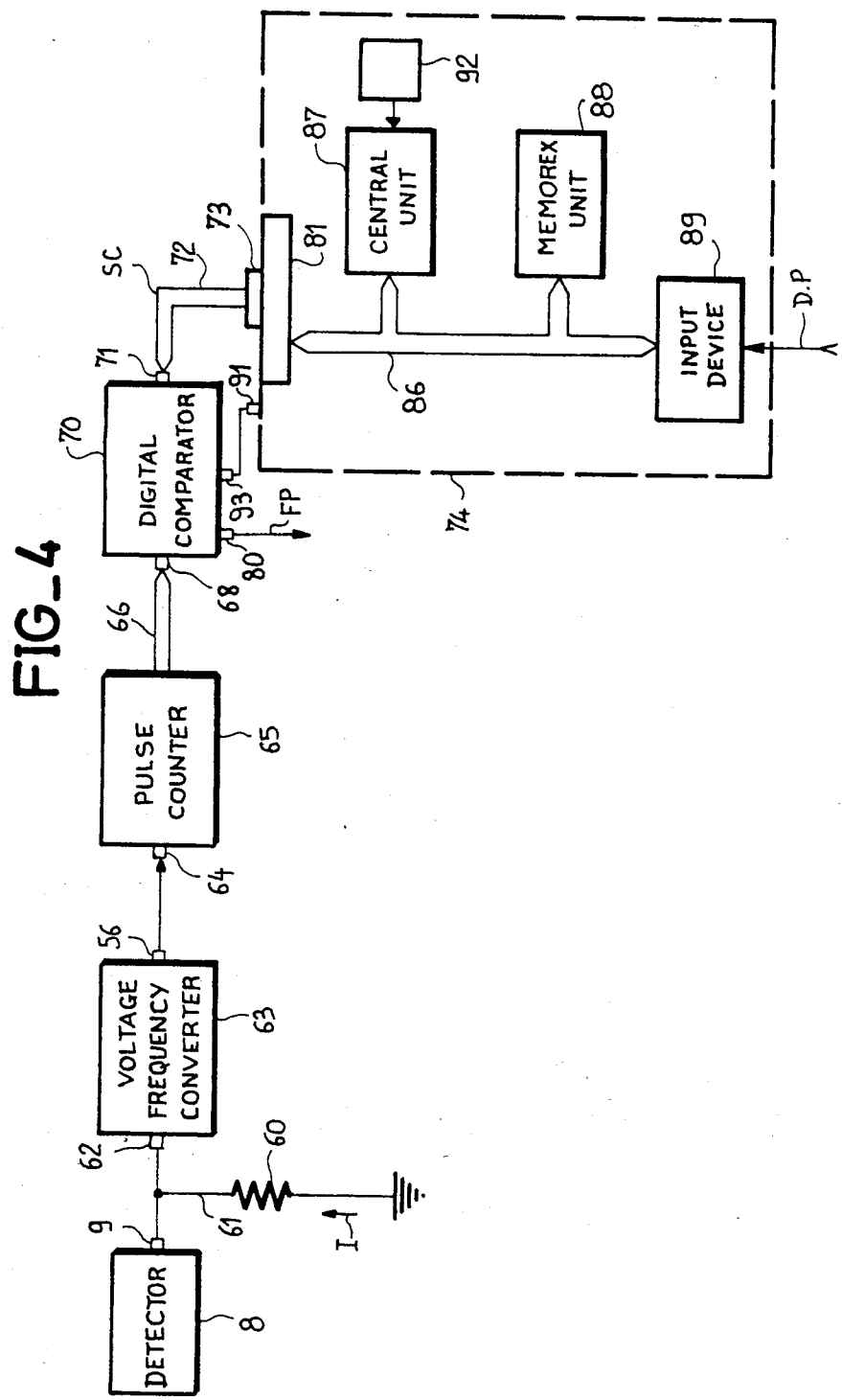

METHOD FOR AUTOMATIC DETERMINATION OF EXPOSURE OF A RADIOGRAPHIC FILM AND AN AUTOMATIC FILM-EXPOSING DEVICE FOR A DIAGNOSTIC RADIOLOGY INSTALLATION IN WHICH SAID METHOD IS EMPLOYED

BACKGROUND OF THE INVENTION

The present invention relates to a method for automatic determination of exposure of a radiographic film in a diagnostic radiology installation in which the radiographic film cooperates with an intensifying screen. The invention is also concerned with an automatic film-exposing device for the utilization of said method in a diagnostic radiology installation in which provision is made for a radiographic film and an intensifying screen exposed to x-radiation.

In order to ensure that the image of a subject or object formed on a radiographic film can be processed under optimum conditions, the different points constituting this image must display sufficient contrast with respect to each other. In other words, blackening of the radiographic film must be correct from one radiograph to the next in spite of any differences in opacity which may be exhibited by the object under radiographic inspection.

Blackening of the film is related to its exposure or so-called radiant exposure, which is the product of the dose rate, or radiation intensity to which the radiographic film is subjected, and the time during which the film is exposed to said radiation.

As a general rule, there are two methods in use for exposing radiographic films in diagnostic radiology installations:

(1) In the first method, the radiographic films are exposed directly to the x-rays which have passed through the object under radiographic inspection.

(2) In the second method, the films are exposed mainly to light emitted by an intensifying screen. By means of this screen, the x-rays which have passed through the object under radiographic examination are converted to light by a fluorescence phenomenon. It is worthy of note that diagnostic radiology installations in which a radiographic film cooperates with an intensifying screen offer a very important advantage from the point of view of the patient who is to undergo an examination. This advantage lies in the fact that the exposure time required in order to obtain an image is much shorter (by a factor of the order of 10) than the time which is necessary when using radiographic films exposed directly to the x-radiation, with the result that the radiation dose received by the patient is reduced in the same ratio.

A certain number of diagnostic radiology installations which utilize the first method are equipped with an automatic film-exposing unit, thus making it possible to obtain automatically the exposure corresponding to correct blackening of the radiographic film (which is exposed directly to the x-radiation).

As a rule, an automatic film-exposing unit of this type incorporates a detector which is sensitive to x-radiation and delivers a current proportional to the dose rate of x-radiation which passes through the radiographic film. The detector which is sensitive to x-radiation is usually constituted either by a conventional ionization chamber or by a semiconductor cell or else by a screen for converting the x-ray photons to light which is guided to a photomultiplier, the light being then converted by said photomultiplier to an electric current I which is proportional to the dose rate. Irrespective of the type of detector employed, the current I which is proportional to the dose rate is integrated over time from the initial instant of the period of exposure and there is thus obtained a value which increases with time and represents the integrated exposure of the film. This increasing value is compared during the period of exposure with a fixed reference value which has been established beforehand as a function of the characteristics of the film. The exposure time is controlled so as to end at the instant when the comparison indicates that the value which is representative of the exposure is equal to the reference value.

Thus, supposing that the dose rate of the current I during the exposure time T is constant, the degree of exposure of the film or radiant exposure EX is equal to the product of the dose rate I and the exposure time T, namely:

$$EX = I \times T$$

In this configuration in which the radiographic film is directly subjected to the x-radiation, constant blackening of the film is obtained from one exposure to the next and independently of the exposure time on condition that the product of the exposure time T and the dose rate I is constant. The radiographic film which is directly exposed to the x-radiation complies with the so-called reciprocity law.

The reciprocity law indicates that the optical density of the film is determined by the integrated exposure and is independent of the length of time during which this exposure is made.

On the other hand, in the case of pairs consisting of intensifying screen and radiographic film, this reciprocity law is no longer verified and there is an observable departure from the reciprocity law which tends to decrease blackening (darkening) of the film when the exposure time T has been increased in order to maintain the product $I \times T$ at a constant value. This arises, for example, from one radiograph to the next when examination requirements have dictated the need to utilize a different x-ray energy level at which it is necessary to reduce the dose rate or in other words the value of the current I.

This deviation from the reciprocity law which may vary according to the type of film represents the relative variation in the radiant exposure required in order to obtain a constant optical density when the exposure time T varies. For example, in the case of a radiant exposure $EX = I \times T = 1$ with $T = 0.1$ second, in order to obtain correct blackening of the film, the radiant exposure EX must increase to about 1.3 in respect of an exposure time $T = 1$ second and must increase to approximately 2 in the case of an exposure time $T = 4$ seconds.

SUMMARY OF THE INVENTION

The present invention relates to a method for automatic determination of exposure of a radiographic film for a diagnostic radiology installation in which the film cooperates with an intensifying screen. By means of this method, it is possible over a broad range of variation in the dose rate followed by variations in the exposure time to obtain film exposure corresponding to correct blackening of this latter while eliminating the adverse effect produced by deviation from the reciprocity law.

The invention is also directed to an automatic radiographic film exposer for diagnostic radiology installations. This automatic film-exposing device carries out said method by virtue of a novel arrangement of means which are simple to apply in practice.

In accordance with the invention, a method for automatic determination of exposure of a radiographic film in a radiology installation in which said film forms with an intensifying screen a screen-film pair which is exposed to x-radiation during a period of exposure T, including the steps of generating a current which is proportional to the dose rate at the level of said screen-film pair, of integrating said current over time from the initial instant of said period of exposure T in order to obtain an exposure signal having a value which increases with time and represents the exposure of said screen-film pair, of applying said exposure signal to a comparator to which a reference signal is also applied in order to compare the values of said exposure and reference signals, then delivering an end-of-exposure command signal for interrupting said x-radiation when said exposure signal and said reference signal have a substantially equal value, the difference in values between said exposure and reference signals being such as to constitute a difference value which decreases as a function of time, is distinguished by the fact that an additional value which increases as a function of time in accordance with a predetermined law is added to the aforementioned difference in values from the initial instant of said period of exposure.

BRIEF DESCRIPTION OF THE DRAWINGS

These and other features of the invention will be more apparent upon consideration of the following description and accompanying drawings, wherein:

FIG. 1 shows diagrammatically a preferred embodiment of an automatic film-exposing device in accordance with the invention for carrying out the method of the invention;

FIG. 2 shows operating lines which give the progressive time-displacement variation in the value of an exposure signal and in the value of a reference signal;

FIG. 3 shows a second embodiment of the automatic film-exposing device in accordance with the invention;

FIG. 4 is a schematic illustration of the automatic film-exposing device in accordance with the invention and in a design of the digital type.

DETAILED DESCRIPTION OF THE INVENTION

FIG. 1 is a schematic presentation of an automatic film-exposing device 1 in accordance with the invention for carrying out the method of the invention in a diagnostic radiology installation.

Apart from the automatic film exposer 1, the diagnostic radiology installation is of a conventional type. In particular, said installation is equipped with an x-radiation source 2 which generates an x-ray beam 3 during operation, said beam being directed onto a panel 4 which has the function of supporting a patient (not shown) in known manner. In addition, the diagnostic radiology installation includes a cassette 5 placed beneath the panel 4 opposite to the x-radiation source 2. In accordance with customary practice, said cassette 5 contains a radiographic film 6 and an intensifying screen 7 of a standard type.

The dose rate, or intensity of x-radiation which passes through the cassette 5 at the level of the screen-film pair 6–7 is known by means of a detector 8 of conventional type which is sensitive to x-radiation. By way of example, said detector is constituted by an ionization chamber which delivers a current I proportional to the dose rate via an exit 9. In the example herein described without any implied limitation, said device 8 is also placed beneath the panel 4 between this latter and the cassette 5.

The current I which is proportional to the dose rate is integrated over an interval of time in order to obtain in a manner known per se an exposure signal EX having an increasing value with time and representing the exposure of the screen-film pair 7–6. To this end, the current I is applied to an integrator formed by an integrating capacitor C1 in the non-limitative example herein described. The function of said capacitor is to integrate the current I over an interval of time or in other words during a period of exposure T during which the screen-film pair 7–6 is exposed to the x-ray beam 3.

The exposure signal EX developed by the charge on capacitor C1 by the current I is applied to a comparator 13 of conventional type consisting of a differential amplifier, for example, the output 9 of the detector 8 being connected at the same time to a first terminal 10 of the capacitor C1 and to a first (positive) input 12 of the comparator 13. In the non-limitative example considered, the second terminal 11 of the capacitor C is connected to ground. In addition, the comparator 13 is connected via a second (negative) input 18 to an output 15 of a generator 16 shown in dashed outline in the Figure. Said generator delivers a reference signal SC with respect to which a comparison of the exposure signal EX is to be made. This comparison takes place from the initial instant of the exposure time T to the instant at which the comparator 13 detects that the exposure signal EX and reference signal SC have substantially the same value. In the customary manner, the comparator 13 then delivers via an output 14 an end-of-exposure command signal FP for the purpose, for example, of interrupting the x-radiation.

In the prior art, the reference signal has a fixed value during the exposure time T, this fixed value being determined as a function of the characteristics of the film employed. In that case the exposure time duration is proportional to the difference in values between the reference signal and the exposure signal EX and inversely proportional to the gradient at which the exposure signal EX increases in order to attain a value substantially equal to that of the reference signal. This gradient (not shown in the FIG. 1) corresponds to a straight line if the dose rate or current I maintains the same value during the period of exposure. In consequence, supposing that the current or dose rate has a different value from one exposure to the next, the exposure attained by the screen-film pair at the end of each period of exposure retains the same value, which does not take into account the deviation from the reciprocity law mentioned in the introductory part of this specification.

In the method contemplated by the invention, the operation is fundamentally different in regard to the fact that, starting from the initial instant of the period of exposure T, the difference in value VD between the reference signal SC and the exposure signal EX is increased, thereby tending to compensate for a reduction in said difference in value produced by the increase in value of the exposure signal EX in the course of time.

There is thus a tendency to add a value which is a function of the elapsed time interval to said difference in value VD. The result achieved by this additional time-dependent value is to delay the instant at which equality is obtained between the values of the exposure signal EX and of the reference signal SC, thus producing an increase in the exposure time duration T, which in turn produces an increase in the degree of exposure of the film at the end of the exposure time T, thus tending to compensate for the deviation from the reciprocity law.

In the embodiment of the automatic film-exposing device 1 in accordance with the invention as shown in FIG. 1, the additional value which increases as a function of time is superimposed on a fixed voltage so as to form the reference signal SC which is delivered by the generating device 16 and applied to the second input 18 of the comparator 13. The generating device 16 is intended to increase said difference value in accordance with a pre-established law, starting from the initial instant of the exposure time T.

In the example herein described without any implied limitation, the generating device 16 is composed of a first and a second amplifier 20, 21 which constitute respectively a summing device and an emitter-follower amplifier in the conventional manner. These two amplifiers 20, 21 as well as the comparator 13 operate from a standard positive and negative 12-volt supply, for example (not shown in the drawings). In this embodiment, the generating device 16 is provided in addition with a potentiometer 22, a first end of which is connected to a source +E which supplies a positive voltage of 12 volts, for example, and a second end of which is connected to ground. A sliding contact 23 of the potentiometer 22 serves to obtain a first voltage V1 which is adjustable between ground and +12 volts, said first voltage V1 being filtered by a filter capacitor 24 connected between ground and the sliding contact 23. The contact 23 is connected through a first resistor R1 to a first (negative) input 26 of the summing device 20, said first input 26 being also connected through a second resistor R2 to the output 28 of the summing device 20. The second (positive) input 29 of the summing device 20 is connected to ground.

The foregoing configuration is of a conventional type since the first input 26 of the summing device 20 is substantially at ground potential whilst the voltage at the output of the summing device 20 is determined by the values of the first and second resistors R1, R2 and by the first voltage V1 at the level of the sliding contact 23 of the potentiometer 22. Thus if it is supposed by way of example that the first voltage V1 at the level of the sliding contact has a value of 5 volts and that the first resistor R1 has a value of 5 kilohms, then the current which passes through the first resistor 25 has a value of 1 mA. Supposing also that the second resistor 27 has a value of 5 kilohms, then the output voltage 28 of the summing device 20 is substantially 5 volts. In the example under consideration, this is the fixed voltage value or so-called threshold value VS to which the additional time-dependent value will be added in order to form the reference signal SC delivered at the output 15 of the generating device 16. By virtue of the summing device 20, the additional time-dependent value which is added to the fixed threshold value SV is generated in such a manner as to vary in accordance with an exponential law.

In the embodiment considered herein by way of example, the exponential variation of the additional value is produced by charging a second capacitor C2 through a charging resistor R4. The second capacitor C2 will hereinafter be designated as a charging capacitor for the sake of enhanced clarity of the description. A point worthy of note is that, in order to have a zero charge at the instant of commencement of the exposure period T, the capacitors C1, C2 are maintained short-period circuited outside the exposure period by conventional means such as electromagnetic relay circuits 31, for example. The electromagnetic relays 31 are connected for example to a control console 32 of the type usually provided in diagnostic radiology installations. The control console 32 is also connected both to the x-radiation source 2 so as to control the operation of this latter and to the output 14 of the comparator 13 in order to receive the end-of-exposure signal FP delivered by the comparator when this latter detects that the exposure signal EX and reference signal SC have substantially the same value in order to interrupt the x-radiation.

The charging capacitor C2 is connected via a first terminal 34 to a first (positive) input 33 of the emitter-follower amplifier 21 and through the charging resistor R4 to the sliding contact 23, the second terminal 35 of the charging capacitor C2 being connected to ground. The second (negative) input 35 and the output 37 of the emitter-follower amplifier 21 are connected to each other and are also connected through a third resistor R3 to the first (negative) input 26 of the summing device 20.

When the relay 31 is actuated in order to suppress the short-circuit of the charging capacitor C2, this latter is charged through the charging resistor R4 in accordance with an exponential law, the time constant of this circuit being given by the value of the charging capacitor C2 and by the value of the charging resistor R4, the input impedance of the emitter-follower amplifier 21 being of a high value. Postulating that the first voltage V1 delivered by the sliding contact 23 is 5 volts, at the end of the charge on the charging capacitor C2, the voltage developed by this latter and applied to the first (positive) input 33 of the emitter-follower amplifier 21 will tend towards 5 volts. Since the gain of the emitter-follower amplifier 21 is in the vicinity of 1, its output 37 will deliver 5 volts. Supposing that the third resistor R3 has a value of 5 kilohms, the current which flows through this third resistor is 1 mA and is added at the level of the summing device 20 to the current which passes through the first resistor R1. There thus appears at the output 28 of the summing device 20 a voltage having a fixed value of 5 volts representing the threshold value VS to which is added in accordance with an exponential law of variation the voltage generated by the charge on the second capacitor C2 so as to form the time-varying reference signal SC.

Thus at the instant of commencement of the exposure period T, the value of the reference signal SC applied to the negative input 18 of the comparator 13 has a value of −5 volts whilst the voltage developed across the terminals of the integrating capacitor C1 and representing the exposure signal EX has a zero value. During the exposure period T, an increase will take place simultaneously in the same direction (that is to say the negative direction with respect to ground in the example under consideration) in the voltage generated by the charge on the integrating capacitor C1 and in the voltage generated by the charge on the charging capacitor C2. The variation in voltage produced by the charge on the first capacitor C1 takes place in accordance with a time-dependent linear law if the dose rate or current I is constant during the period of exposure. In the example under consideration, it should be pointed out in the first place that the charging resistor R4 is adjustable and thus makes it possible to adjust the time constant of the circuit formed with the second capacitor C2 so as to adjust the initial gradient (shown in FIG. 2) at which a variation occurs in the additional value V constituted by the voltage developed by the charge on the charging capacitor C2. A second point worthy of note is that the third resistor R3 is also adjustable in order to adjust the value attained by said additional value VA at the output 28 of the summing device 20, that is to say in order to adjust the asymptotic value. It is thus possible to make corrections in the curve of variations (not shown in FIG. 1) of the reference signal SC as a function of the characteristics of the radiographic film 6 employed.

FIG. 2 illustrates the operation of the automatic film-exposing device 1 in accordance with the invention by showing on the one hand a first curve 35 representing the variation in value of the exposure signal EX as a function of the time interval t and by showing on the other hand a second curve 36 representing the variation in value of the reference signal SC as a function of the time interval t. In the non-limitative example described, the values attained and plotted as ordinates are expressed by a negative voltage −V and represent in the case of the first curve 35 (exposure signal EX) the value of exposure attained by the screen-film pair 7–6.

At the start of the exposure time T at an instant to, the capacitors C1, C2 shown in FIG. 1 are no longer short-circuited. Thus the first curve 35 shows that the exposure signal EX has a zero value whilst the second curve 36 shows that the reference signal SC has a value of −5 volts corresponding to the fixed voltage which forms the threshold value VS.

Starting from the instant to, the exposure signal EX increases (negatively in the example considered) in accordance with a gradient which is directly proportional to the current I and inversely proportional to the value of the integrating capacitor C1 and the reference signal SC increases in accordance with an exponential law corresponding to the additional value VA produced by the charge on the charging capacitor C2. If the gain of the generator 16 and the reversal of polarity produced by this latter in the voltage generated by the charge on the charging capacitor C2 are not taken into account for the sake of enhanced clarity of the description, and supposing that the current I corresponding to the dose rate is constant during the exposure time T, the equality of value between the exposure signal EX and the reference signal SC corresponds to the following relation:

$$\frac{I}{C1} \times T = VS + V1 \left( 1 - \exp \frac{-T}{C2 \cdot R4} \right);$$

where
I is expressed in amperes,
C1 and C2 are expressed in farads,
T is the exposure time expressed in seconds,
VS is the threshold value in volts,
V1 expressed in volts is the first voltage delivered by the sliding contact 23,
R4 is the resistor in series with the charging capacitor C2 and having a value of resistance expressed in ohms.

In the example of FIG. 2, the integrating capacitor C1 has a value of the order of $10^{-8}$ farad and the current I has a constant value of the order of $8 \cdot 10^{-8}$ ampere: the first curve 35 representing the exposure signal EX constitutes a straight line which starts from zero at the instant to so as to attain a value of 8.15 V at the instant t1, that is to say in 0.1 second.

Furthermore, in the non-limitative example herein described, the charging capacitor C2 has a value of $2 \cdot 10^{-7}$ farad, the charging resistor R3 has a value of 10 MΩ and the first voltage V1 is 5 V. The charge on the charging capacitor C2 produces an exponential variation which is shown by the second curve 36 and is added to the threshold value VS (5 V) from the instant to so as to form the reference value SC. When one second has elapsed from the instant to, the exposure signal EX and reference signal SC have substantially the same value (8.15 V) and the exposure period T comes to an end. The exposure value attained by the screen-film pair 7–6 corresponds to 8.15 V and the additional value VA is constituted by the difference between 8.15 and the threshold value VS, namely $8.15 - 5 = 3.15 \ V$.

Postulating that, in the following exposure, the current I has a value of $4 \cdot 10^{-8}$ ampere, the exposure signal EX increases in accordance with a third curve 37 and attains a value substantially equal to that of the reference signal SC at an instant t2 located at the end of a time interval of 1.5 second after the instant t1. The second exposure period T' is in this case of the order of 2.5 seconds.

As explained earlier, adjustment of the charging resistor R3 makes it possible to adjust the starting gradient 30 represented by the dashed line in FIG. 2 and adjustment of the third resistor R3 makes it possible to adjust the asymptotic value 92 which is also represented by a dashed line. This permits the nearest possible approximation to the curve (not shown) representing the relative variation in exposure required in order to obtain constant optical density as explained in the introductory part of this specification. A curve of this type is plotted experimentally for a given type of film.

FIG. 3 shows a second example of construction in which, instead of adding the additional time-varying value VA to the threshold value VS in order to make the reference value SC variable, said additional value VA is subtracted from the value of the exposure signal EX, that is to say from the voltage developed by the charge on the integrating capacitor C1 by the first current I.

This novel mode of operation in accordance with the method contemplated by the invention thus arises from a basic concept in which the difference value VD represented by the difference in value at the inputs 12, 18 of the comparator 13 is added from the instant of commencement of the exposure period T, that is to say in which the additional value V which increases with time is added to the difference between the value of the exposure signal EX and the reference value SC (formed in this case solely by the threshold value VS).

Said difference in value is accordingly increased in the manner described by way of example in the foregoing. The circuit arrangement adopted for this purpose is shown within a dashed-line rectangle in FIG. 3, this unit being generally designated by the reference 50.

As in the preceding example, the integrating capacitor C1 is connected through its first terminal 10 to the output 9 of the detector 8 and to the first (positive) input 12 of the comparator 13 in order to integrate the first current I with respect to time and to apply to the first input 12 the voltage developed by the charge of the first current I, that is to say the exposure signal EX. The second terminal 11 of the integrating capacitor C1 is not connected to ground as in the previous example but to an output 51 of the unit 50 in order to increase the difference value aforesaid. The unit 50 includes the charging capacitor C2 mentioned earlier. The first terminal 34 of this capacitor is connected to the output 51 or in other words to the second terminal 11 of the integrating capacitor C1 and the second terminal 35 of said charging capacitor is connected to ground. The output 51 is connected within the unit 50 through the charging resistor R4 to an output 41 of a amplifier 40 of a conventional type. The output 41 of the amplifier 40 is connected through an adjustable resistor 42 to a first (negative) input 43 of the amplifier 40. The second (positive) input 44 of said amplifier 40 is connected to ground. In addition, the first (negative) input 43 is connected through a resistor 45 to the sliding contact 23 of the potentiometer 22. The first end of the potentiometer 22 is connected to a negative voltage source $-E$ of $-12$ volts, for example. The second end of said potentiometer is connected to ground. A filter capacitor 24 is connected between the sliding contact 23 and ground so as to filter a second voltage V2 delivered by the sliding contact 23, the value of this voltage being between ground and $-12$ volts. The resistor 45 and the adjustable resistor 42 constitute a gain control circuit for obtaining a third voltage V3 which is positive with respect to ground at the output 41 of the amplifier 40. In the same manner as in the previous example, the integrating and charging capacitors C1, C2 are maintained in the short-circuited condition outside the exposure period T by conventional means such as electromechanical relays 31, for example. Since the diagnostic radiology installation is similar to that shown in FIG. 1, it is not illustrated in FIG. 3 except for the control console 32 which serves to control the electromagnetic relays 31 and to obtain the end-of-exposure command signal FP generated by the output 14 of the comparator 13 in the same manner as in the example shown in FIG. 1.

At the commencement of the exposure period T, the integrating and charging capacitors C1, C2 are no longer short-circuited and are charged simultaneously throughout the duration of the exposure period T. It is worthy of note that the capacitors C1, C2 are in series with respect to the first current I. In consequence, the value chosen for the charging capacitor C2 is of a high order (a ratio of 10, for example) in comparison with the value of the integrating capacitor C1 so as to ensure that the voltage generated by the charge on the charging capacitor C2 by the first current I is negligible. The first current I charges the integrating capacitor C1 so as to ensure that the first capacitor plate 10 is negative with respect to ground. At the same time, the positive third voltage V3 delivered by the output 41 of the amplifier 40 determines through the charging resistor R4 a second current I2 which charges the charging capacitor C2 with polarities opposite to the charge developed at the terminals 10, 11 of the integrating capacitor C1. In other words, the first plate 34 of the charging capacitor C2 is positively charged with respect to ground.

In this configuration, the charge applied to the integrating capacitor C1 by the first current I develops across the terminals 10, 11 of this capacitor a negative voltage with respect to ground corresponding to the exposure signal EX which increases linearly with time.

The charge applied to the charging capacitor C2 by the second current I2 develops across the terminals 34, 35 of this capacitor a positive voltage with respect to ground which increases in accordance with an exponential law. In consequence, at absolute value, the voltage applied to the first input 12 of the comparator 13 results from the algebraic sum of the voltages developed across the terminals of the integrating capacitor C1 and across the terminals of the charging capacitor C2. The second (negative) input 18 of the comparator 13 is connected to the sliding contact 23 of the potentiometer 22. The voltage delivered by the sliding contact 23 constitutes the fixed threshold value VS. In this example, the reference signal SC thus has a fixed value during the exposure period T.

At the start of the exposure period T, the voltage applied to the first (positive) input 12 of the comparator 13 is zero and the difference value VD is given by the threshold value VS. The simultaneous charge with opposite signs of the integrating and charging capacitors C1, C2 has the effect of subtracting the voltage VA produced by the charge on the second capacitor C2 from the value of the exposure signal (voltage at the terminals of capacitor C1). In the same manner as in the previous example, this has the effect of delaying the instant at which the comparison by the comparator 13 subsequently indicates that the value of the exposure signal EX is substantially equal to the value of the reference signal SC.

FIG. 4 shows an alternative embodiment of the invention which constitutes a design of a digital type.

In this embodiment, the output 9 of the detector 8 is connected to the first end 61 of a resistor 60, the second end of which is connected to ground. The first end 61 of the resistor 60 is also connected to an input 62 of a voltage/frequency converter 63 of conventional type so that the voltage drop produced by the resistor 61 generates a frequency (not shown) which is related to said voltage drop. An output 56 of the voltage/frequency converter 63 is connected to the input 64 of a pulse counter device 65. The number of pulses per units of time correspond to the frequency generated by the voltage/frequency converter 63 in accordance with standard practice. The pulse counter device 65 is of conventional design, for example of the type comprising a series of flip-flops (not shown in the drawings), the respective state of which indicates the number of pulses counted. The state of these flip-flops is transmitted via connections represented in FIG. 4 by a bar 66 to the input 68 of a digital comparator 70 of conventional type. The comparator 70 also receives on inputs 71 a value which is transmitted via connections represented schematically by a second bar 72 derived from outputs 73 of a digital generating device 74 as shown within a dashed-line rectangle in FIG. 4. The value delivered by the device 74 varies as a function of time in accordance with a curve such as the second curve 36 corresponding to the reference signal SC and shown in FIG. 2. By means of said digital generating device 74, the reference signal SC is generated and increased as a function of time in accordance with an exponential law.

When the number of pulses delivered by the counting device 65 attains the same value as the reference signal SC delivered by the digital generating device 74, the digital comparator 70 delivers via an output 80 an end-of-exposure command signal FP which, as in the preceding examples, is applied to the control console 32 (not shown in FIG. 4).

A construction of this type is particularly well-suited for a microprocessor system and presents no difficulty for any one versed in the art. By way of example, the digital generating device 74 can have an output interface 81 for delivering the reference signal SC. As represented schematically in FIG. 4, a fourth bar 86 connects said output interface 81 on the on hand to a central unit 87 and on the other hand to a memory 88 in which are stored the different values of the reference signal SC as a function of time. The bar 86 also serves to connect said interface to an input device 89 to which the start-of-exposure signal DP is applied, said signal being delivered by the aforementioned control console 32 (not shown in the Figure). The digital generating device 74 is also provided in a conventional manner with a clock 92 connected to the central unit 87.

The method accordingly consists in comparing the values of numbers of pulses counted by the counting device 65 with the values of the reference signal SC at predetermined time intervals $\Delta T$ which may be constant, for example. At each time interval, a fresh value contained in the memories 88 is transferred to the digital comparator 70 via the output 81, said output being also connected to an input 93 of the comparator 70 through an output 91 in order to permit comparison only when the value of the reference signal SC is perfectly established.

It has been shown that the method and arrangement of means set forth in this specification provide compensation for the effect of deviation from the reciprocity law when a radiographic film 6 is exposed to x-radiation by means of an intensifying screen 7. It will remain apparent, however, that the foregoing description of the method in accordance with the invention and the automatic film exposer 1 for carrying out said method are given solely by way of example without any limitation being implied.

What is claimed is:

1. A method for automatic determination of exposure of a radiographic film in which said film forms with an intensifying screen a screen-film pair which is exposed to x-radiation during a period of exposure T, including the steps of generating a current which is proportional to the dose rate at the level of said screen-film pair, integrating said current over time the initial instant of said period of exposure T in order to obtain an exposure signal having an absolute value which increases with time and represents the exposure of said screen-film pair, applying said exposure signal to a comparator to which a reference signal is also applied, applying an additional signal to either said exposure signal or said reference signal, at said comparator in order to compare the sum of the magnitudes of the additional signal and the reference signal with the magnitude of the exposure signal, said comparator delivering an end-of-exposure command signal when said sum of the magnitudes of the reference and additional signals and said magnitude of the exposure signal have a substantially equal value, the difference in values between said exposure and reference signals being such as to constitute a difference value which decreases as a function of time, wherein said additional signal has a magnitude which increases as a function of time from the initial instant of said period of exposure.

2. A method according to claim 1, wherein the magnitude of the additional signal aforesaid increases in accordance with an exponential law.

3. A method according to claim 1, wherein said exposure signal is applied to a first input of said comparator and wherein said reference signal is applied to a second input of said comparator, said reference signal being constituted by a fixed threshold signal, said additional value which increases as a function of time being added to said fixed threshold value.

4. A method according to claim 1, wherein said exposure signal is applied to a first input of said comparator whilst a second input of said comparator receives a fixed threshold value and wherein said additional signal which increases as a function of time is subtracted from said exposure signal.

5. A method according to claim 1, wherein said additional signal is obtained by charging a capacitor through a charging resistor at a constant voltage.

6. A method according to claim 1, wherein the current which is proportional to the dose rate is integrated by an integrating capacitor.

7. A method according to claim 1, or claim 5, wherein the integrating and charging capacitors are mounted in series and wherein the charging capacitor has a high value in comparison with the integrating capacitor.

8. A method according to claim 7, wherein the voltages developed by the charge on the integrating and charging capacitors have opposite polarities.

9. An automatic film-exposing device for a diagnostic radiology installation in which a radiographic film and an intensifying screen form a screen-film pair which is exposed to x-radiation during a period of exposure T, wherein said film-exposing device comprises:
   a detector which is sensitive to x-rays and delivers a current proportional to the dose rate at the level of said screen-film pair;
   an integrator which has the function of integrating said current with respect to time from the initial instant of said period of exposure T and delivering an exposure signal having absolute value which increases with time and represents the exposure of said screen-film pair;
   means for generating a reference signal
   a comparator having the function of comparing the magnitude of said exposure signal with the sum of the magnitude of a reference signal and the magnitude of said additional signal, wherein said film-exposing device is further provided with means so that an additional signal is generated from the initial instant of said period of exposure T at a magnitude which varies as a function of time, an end-of-exposure signal being delivered by said comaprator when the values of the magnitude of said exposure signal and the sum of the magnitudes of said reference signal and said additional signal are substantially equal.

10. An automatic film-exposing device according to claim 9, wherein the means for generating said additional signal include a charging capacitor which is charged to a constant voltage through a charging resistor so as to establish the additional value which varies as a function of time in accordance with an exponential law.

11. An automatic film-exposing device according to claim 9, wherein the means for generating said reference signal include a voltage source connected through a resistor to a summing device so as to obtain a fixed threshold signal to which said additional value is added in order to constitute said reference signal.

12. An automatic film-exposing device according to claim 9, wherein said integrator is constituted by an integrating capacitor.

13. An automatic film-exposing device according to claim 10 wherein said charging capacitor is mounted in series with an integrating capacitor and wherein said integrating capacitor has a low capacitance value with respect to said charging capacitor.

14. An automatic film-exposing device according to claim 13, wherein means are provided for charging said integrating and charging capacitors such that the capacitors are charged to voltages of opposite polarities.

15. An automatic film-exposing device according to claim 10, wherein said charging resistor is adjustable in value.

16. An automatic film-exposing device for a diagnostic radiology installation in which a radiographic film and an intensifying screen form a screen-film pair which is exposed to x-radiation during a period of exposure T, wherein said film-exposing device comprises:

a detector which is sensitive to x-rays and delivers a current proportional to the dose rate at the level of said screen-film pair;

an integrator which has the function of integrating said current with respect to time from the initial instant of said period of exposure T and delivering an exposure signal having a value which increases with time and represents the exposure of said screen-film pair;

means for generating a reference signal;

a comparator having the function of comparing said exposure signal with a reference signal, wherein said reference signal is constituted by a fixed threshold value to which is added an additional value which increases as a function of time so as to modify said reference signal in accordance with a predetermined curve, said reference signal being generated by a generator which include a memory unit in which are stored the values representing said predetermined curve, and end-of-exposure signal being delivered by said comparator when the values of said exposure and reference signals are substantially equal.

* * * * *